United States Patent [19]

Anselmi et al.

[11] Patent Number: 4,778,306
[45] Date of Patent: Oct. 18, 1988

[54] METHOD FOR LAUNCHING FROM THE MAINLAND LARGE-SIZE SUBMARINE PIPELINES

[75] Inventors: Alberto Anselmi; Bruno Saltalamacchia, both of Fano, Italy

[73] Assignee: Snamprogetti S.p.A., Milan, Italy

[21] Appl. No.: 938,602

[22] Filed: Dec. 5, 1986

[30] Foreign Application Priority Data

Dec. 6, 1985 [IT] Italy .................... 23129 A/85

[51] Int. Cl.$^4$ .................................................. F16L 1/02
[52] U.S. Cl. .................................. 405/171; 405/136; 405/158
[58] Field of Search ............... 405/154, 157, 158, 166, 405/167, 168, 169, 170, 171, 172, 173

[56] References Cited

U.S. PATENT DOCUMENTS

| Re. 30,825 | 12/1981 | Guy et al. ........................ 405/169 X |
| 650,134 | 5/1900 | Phillips ........................... 405/171 |
| 2,731,800 | 1/1956 | Collins ......................... 405/171 X |
| 2,807,937 | 10/1957 | Rhodes ......................... 405/171 X |
| 3,479,831 | 11/1969 | Teague ......................... 405/171 X |
| 3,487,648 | 1/1970 | Lawrence ...................... 405/171 X |
| 3,756,034 | 9/1973 | Lochridge et al. ............ 405/171 X |
| 3,977,201 | 8/1976 | Bittner ............................ 405/170 |
| 4,104,886 | 8/1978 | Dumont et al. ................ 405/171 |
| 4,360,290 | 11/1982 | Ward ............................... 405/170 |

FOREIGN PATENT DOCUMENTS 50162 4/1982 European Pat. Off. ........... 405/171

Primary Examiner—Dennis L. Taylor
Attorney, Agent, or Firm—Birch, Stewart, Kolasch, & Birch

[57] ABSTRACT

The method of laying an underwater pipeline which is assembled in sections at the shoreline and conveyed from the shoreline along the bottom of a waterway, said pipeline being divided by separation means into a plurality of cylindrical sections provided with regulating means for selectively introducing thereto or removing therefrom ballast water or compressed air, which comprises flooding at least a portion of the cylindrical sections in sequence as they are introduced into the waterway in order to achieve a desired residual weight, maintaining said desired residual weight by introducing compressed air into said cylindrical sections to displace excess ballast water contained therein, and continuing the layering of the pipeline along the bottom of the waterway by selectively supplying or discharging ballast water or compressed air to the cylindrical sections, and completely flooding the pipeline to complete its positioning at the bottom of the waterway and removing the cylindrical sections and the compressed air and ballast introducing and removing means from the pipeline.

7 Claims, 1 Drawing Sheet

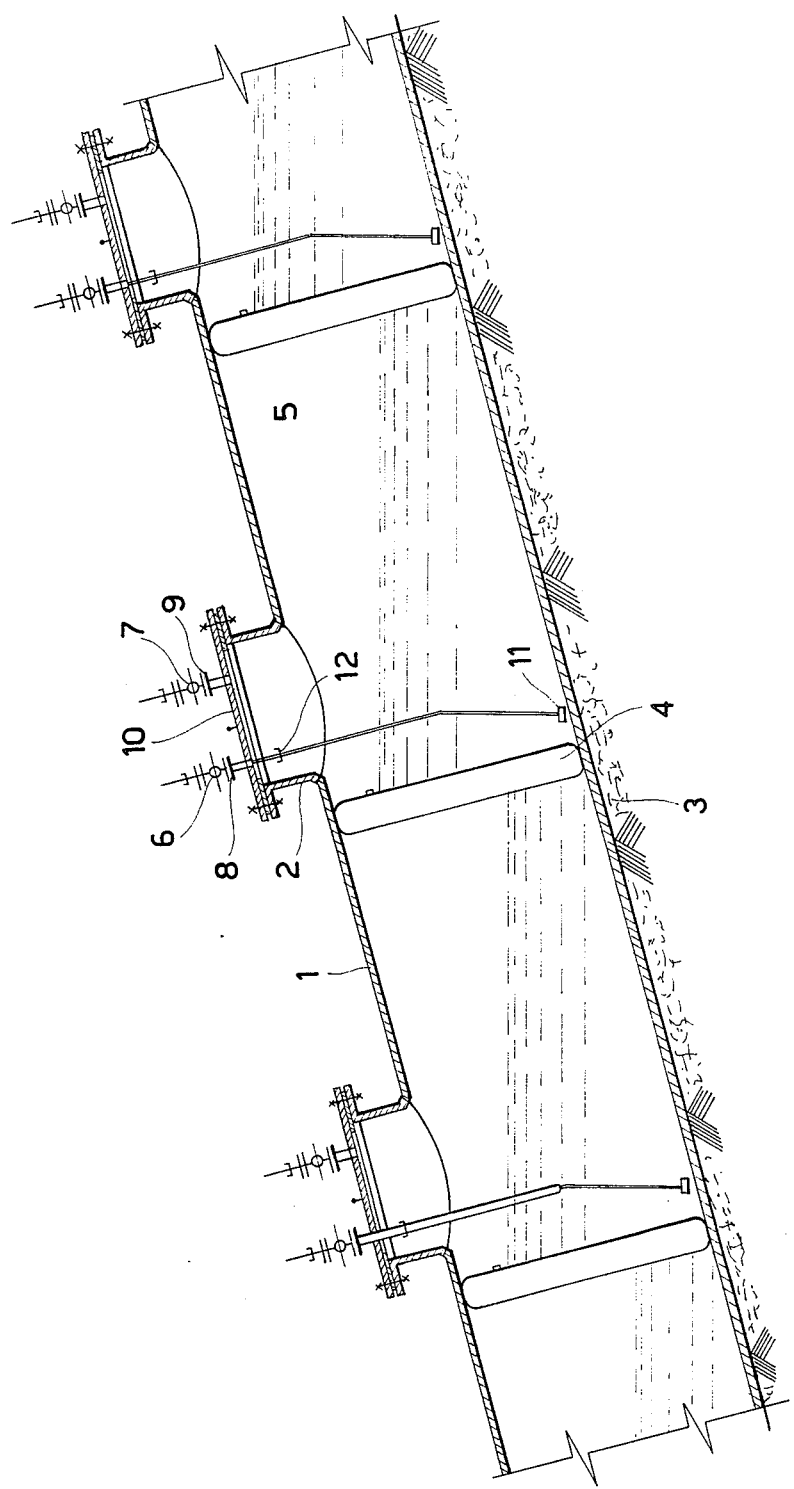

METHOD FOR LAUNCHING FROM THE MAINLAND LARGE-SIZE SUBMARINE PIPELINES

BACKGROUND AND SUMMARY OF THE INVENTION

The present invention relates to a method of launching of large-size submarine pipelines, starting from the mainland, where they are previously assembled from shorter sections.

More particularly, the present invention relates to the laying of pipelines for crossing stretches of fresh water or stretches of sea of small size, of water streams, or for water intakes for industrial works, the assemblage of which is carried out on the mainland, with the assembled pipeline then being launched by being pulled from its offshore end, by means of an anchored pontoon, or by a winch with an offshore return.

According to the launch technology, the pipeline section assembled on the mainland must be launched while being equipped with suitable weights, so that the structure being launched has an overall specific gravity slightly higher than the water in which it is being launched.

With a specific gravity slightly higher than that of the medium in which the pipeline is being launched, the pipeline section is permitted to maintain, while it is being laid, a residual water weight which keeps it in correspondence to the profile of the water bottom and in an assigned position, by counteracting the thrust applied to it by possible streams, current motion or other environmental stresses. At the same time, the pipeline being launched should not show too high a frictional resistance to the launching operation.

With the equipment for pulling the pipeline being the same, the preassembled pipeline sections can be longer, the lower the "specific" resistance offered by the pipeline.

According to the technique of the prior art, various modalities are presently applied for increasing the weight of the pipeline. Such modalities are now described briefly.

The most widespread launching method consists in welding onto the offshore end of the pipeline which is being launched, a blind component, of either a conical or rounded shape, provided with means for anchoring the pulling cables, which allows the pipeline to be tightly sealed; maintaining the pipeline in an empty state, and increasing its weight by applying onto its outer surface a coating of cement mortar of various compositions which is provided with reinforcing elements ("concrete spraying" process).

The increase in weight obtained by means of the concrete spraying method is very inaccurate inasmuch as practically obtaining, at the end of the operation, the theoretical thickness and hence the theoretical weight of the material being applied onto the pipeline, in particularly, in case of large-diameter pipelines, is difficult. Furthermore, the concrete spraying process results are expensive, both because of the need for large amounts of the required materials and due to the long processing times required for their application, hardening, and their necessary ageing, before it is possible for the pipeline to slid on the bottom.

Another draught method for increasing the weight of the pipeline consists in applying, to the mouth of the end of the pipeline being launched, a blind component, as in the former method, and in then flooding the pipeline. The specific weight of the pipeline is maintained at the desired value by applying, along the length of the pipeline, a plurality of floating bodies, which support it.

According to a more common variant of such a method, the floating bodies are applied externally to the pipeline, at discrete intervals in the axial direction, by means of suitable fastening means (brackets, ropes, chains, etc.). At the end of the launch, the floating bodies and their fastening means are removed and recovered. Such a variant has drawbacks derived from the fact that, especially during the initial portion of their run together with the pipeline, the buoys as well as the fastening means undergo creeping, and damage.

In addition to the costs derived from the possible replacement and repair of such buoys and fastening means, such damage requiters the launching operations to be stopped to the purpose of repairing the damaged buoy, thus lengthening the entire installation process.

In order to obviate such drawbacks, according to an improved variant having a such a method, floating bodies of long shape were placed inside the pipeline.

Such a feature overcomes the drawbacks characterizing the former variant, but causes notable complications, as regards the proper positioning of the floating bodies inside the pipeline, and the procedure for recovering them, at the end of the pipeline launch.

During the launching operation, the buoys used to attain the desired residual weight of the water-filled pipeline, applied both inside the pipeline and externally to it, are dragged to increasing depths.

This fact leads to a considerable drawback for the buoys made of such pneumatic bodies as balloons or cylinders filled with compressed air, which are the buoys endowed with the best handling and economy characteristics.

Such pneumatic bodies, placed at an increasing depth, shrink due to an increase in the outer pressure. To restore their value of positive, upward buoyancy, such bodies have to be inflated, as the launch brings them to increasing depths, in order to bring them back to their initial value.

As an alternative, it is also possible to change the length of the connection between the pipeline being launched and the outer buoys so be to keep these buoys at a substantially constant depth.

Both of these solutions are complex.

The adoption of rigid buoys, able to withstand the outer pressure, requires the use of rather heavy, poorly handeable metal structures.

Both of the procedures of application of the buoys during the launch, and the procedure for the recovery of the buoys, at the end of the launch, are complex.

The techniques exposed up to the present suffer from the drawback that the increase in weight conferred to the pipeline cannot be easily adjusted or modified during the laying procedure, should, e.g., the unevennesses of the bottom or changes in the ambient conditions require the residual weight of the whole pipeline, or portions thereof, to be changed.

The laying process according to the present invention allows the weight of a pre-assembled pipeline to be increased with precision, to a desired weight value for a pipeline being launched from the mainland, and said weight can be varied, both over time and along the various sections of the pipeline. Also the launch can be carried out easily, quickly and economically.

Such a proces of the present invention shall be disclosed, by referring to the FIGURE, in the specific application to the launch of a large-size pipeline destined as water intake installations for industrial plants.

However, the following disclosure should not be considered as being limitative of the scope of the present invention, in that the present process can be used also for large-size pipelines for different uses.

Such pipelines are characterized indeed by very large flowrates, and thus large diameters—up to more than 2,500 mm—as well as by low operating pressure drops, and, consequently, by very limited wall thicknesses within the range of from 15 to 30 mm, which render such pipelines very delicate during the launch operations, should they undergo stresses not uniformly distributed lengthwise to the pipeline.

According to the coastal site the water intake units for industrial plants are being installed at, these units have a length which is usually within the range of up to 3 km, and are layed at such a depth as to guarantee the intake of clean water, at a substantially constant temperature during the medium term and are, not influenced by day to day temperature changes. According to the site, the depth, in the most frequent cases, is within the range of from 10 to 15 meters.

By starting from the intake end, equipped with various grids and devices, to prevent foreign bodies of discrete dimensions to enter the pipeline, the pipeline extends up to the mainland, wherein the industrial works are installed. In many instances, in the intake unit, in a sea environment, means are installed for the supply, the metering and the distribution of additives to prevent, or, at least, limit, the growth of colonies of marine flora and/or fauna—seaweeds, shellfish and the like—which may occlude the pipeline, within a short period of time, rendering it useless.

The pipelines of the intake installations are provided, at discrete lengths, with large manholes, which allow skin-divers, provided with aqualungs, to enter the inside of the pipeline, to periodically inspect the pipeline and eventually service it.

The length of such sections, between the manholes, is generally within the range of from 50 to 120 m, and the manhole has an inner diameter of from 1200 to 1800 mm, which allows the skin-divers and their equipment to easily enter the pipelines.

BRIEF DESCRIPTION OF THE DRAWINGS

The present invention will become more fully understood from the detailed description given hereinbelow and the accompanying drawings which are given by way of illustration only, and thus are not limitative of the present invention, and wherein: the single FIGURE shows the method of installing a pipeline as defined by the present invention.

DETAILED DESCRIPTION OF THE INVENTION

The attached FIGURE shows a pipeline 1, provided with manholes 2 the pipeline advance along the bottom 3, from the right to the left thereof.

The launch process according to the invention consists of the following main stages.

Before the launch operation is started, removable separation members 4 are installed in each of the sections of the pipeline between the manholes. the separation members subdivide the volume of the pipeline into a plurality of cylindrical volume 5, each having a length about equal to the interval between the manholes.

The removable separation members can be made, e.g., by balloons to be inflated by pressurized fluids; by blind monolithic plates provided at their periphery with a toroidal gasket, which is suitable to be expanded by analogous pressurized fluids, having such dimensions that the monolithic plate can easily pass through the manhole; and modular plates which are assembled so as to form a blind disc which is always provided with an expandable toroidal gasket.

For each cylindrical volume 5, and according to a preferred embodiment of the present invention, two connections equipped with valves 6 and 7 are provided, which extend through each manhole. The first connection is attached to a dipleg 11 which reaches to the lower portion of the cylindrical chamber and is used to the add and remove ballast water. The second connection is attached to the top of the manhole and is used for the introduction and removal of the air.

The thus-structured and prearranged pipeline is made to advance in the leftward direction. While the pipeline section being discussed is still sliding on the mainland, on a suitably prepared path, or is still only partly submerged, the pipeline is preferably free of water so that its resistance to dragging is very low. Possibly, special guide and support rollers or equivalent means can be used to secure good sliding and prevent the pipeline from being damaged.

In the dipping area, where the pipeline is being launched into the water, water is fed into section 5 through valve b, up to a desired value. From a general viewpoint, such a value may be as high as 250 kg/m$^3$, with the preferred residual weight range being from 10 to 30 kg/m$^3$.

Possible excess amounts of ballast water can be removed by opening the on-off valve 6 provided on the water connection and introducing compressed air through valve 7, which expels a desired amount of water from the connection valve 6.

The launch process according to the present invention allows the residual weight of the pipeline to be easily controlled, both over time and in space, and thus allows the pipeline to be laid with higher precision and at a faster speeds than prior art methods.

The value of the residual weight to be conferred to the pipeline during the launch depends on the environmental conditions, on its size and on the available draught equipment.

The supply of the required amount of ballast water can be controlled by means of the interposition of volumetric meters, or of equivalent means, capable of supplying sufficient measurement precision on the connection valve 6.

In precise specific way, such a measurement is required as a function of the tolerances required by the design for the residual weight values.

The launch is carried out on the pipeline, which is brought to the desired water weight, by applying a draught action to the offshore end of the pipeline.

Such a draught can be carried out from a pontoon, placed nearby the intake end, suitably anchored and equipped with winches. As an alternative, the winches can be installed on the mainland, with an offshore-positioned return.

Once that the launch of the pipeline has ended, the service equipment is removed from the pipeline.

Such an operation is carried out by skin-divers, serviced by barges.

The operations consist in general of the following steps, for each cylindrical chamber 5:
complete filling of the pipeline;
removal of connections 6 and 7;
disengament of the cover 10 of the manhole and lifting thereof;
removal of the dipleg 11, by disconnecting the connection 12;
application of the fittings 8 and 9, which were formerly connected to the connection values 6 and 7, blind flanges (as an alternative, said fittings can be removed, and the remaining bores can be closed by screw-threaded plugs);
disengagement of the separation members 4;
recovery of the separation members, by passing its components either through the manhole 2, or through the end of the pipeline;
closure of the manhole 2 again by means of the cover 10.

The disclosure of the method of the present invention has been referred to the typical case of the launch of a pipeline intended for water intake installations for industrial works.

Such a launch process can be advantageously implemented also for launching pipelines through water stretches, for, e.g., crossing water streams, lakes, or sounds, such pipelines being, in any case, assembled on the mainland, and subsequently launched.

The process can be applied as well for crossing short water stretches, without manholes being available. As removable separation members, inflatable balloons can be used which are linked in seried to recovery cables. Service connections can be directly applied on the pipeline.

Such a technical solution proves itself suitable, especially for pipelines smaller dimensions than of those intended for intake installations.

The invention being thus descriibed, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. The method of laying an underwater pipeline which is assembled in sections at the shoreline and conveyed from the shoreline along the bottom of a waterway, said pipeline being divided by separation means into a plurality of cylindrical sections provided with regulating means for selectively introducing thereto or removing therefrom ballast water or compressed air, which comprises
   flooding at least a portion of the cylindrical sections in sequence as they are introduced into the waterway in order to achieve a desired residual weight,
   maintaining said desired residual weight by introducing compressed air into said cylindrical sections to displace excess ballast water contained therein, and
   continuing the layering of the pipeline along the bottom of the waterway by selectively supplying or discharging ballast water or compressed air to the cylindrical sections, and
   completely flooding the pipeline to complete its positioning at the bottom of the waterway and removing the cylindrical sections and the compressed air and ballast introducing and removing means from the pipeline.

2. The method of claim 1 wherein manholes are provided in the pipeline sections and the separation means are positioned on opposite sides of each manhole to define said cylindrical sections.

3. The method of claim 1 wherein the average residual weight of the pipeline in water is maintained at less than 250 kg/m$^3$.

4. The method of claim 1 wherein the average residual weight of the pipeline in water is maintained within the range of from 10 to 30 kg/m$^3$.

5. The method of claim 1 wherein the removable separation means are of the expandable type which are inflatable by a pressurized fluid.

6. The method of claim 1 wherein the removable separation means are plates provided at their periphery with a toroidal gasket which is expandable by means of a pressurized fluid.

7. The method of claim 2 where the regulating means are respective valve means for the ballast water and compressed air, said valve means being disposed in the manhole cover.

* * * * *